US011010256B1

(12) United States Patent
Holenstein et al.

(10) Patent No.: US 11,010,256 B1
(45) Date of Patent: *May 18, 2021

(54) METHOD AND SYSTEM FOR IMPLEMENTING CURRENT, CONSISTENT, AND COMPLETE BACKUP COPY BY ROLLING A CHANGE LOG BACKWARDS AGAINST A STORAGE DEVICE

(71) Applicant: Gravic, Inc., Malvern, PA (US)

(72) Inventors: Paul J. Holenstein, Downingtown, PA (US); Bruce D. Holenstein, Media, PA (US); Wilbur H. Highleyman, Blairstown, NJ (US); John R. Hoffmann, Kennett Square, PA (US)

(73) Assignee: GRAVIC, INC., Malvern, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/172,555

(22) Filed: Feb. 10, 2021

Related U.S. Application Data

(63) Continuation of application No. 16/916,815, filed on Jun. 30, 2020, now Pat. No. 10,922,186, which is a continuation of application No. 16/170,762, filed on Oct. 25, 2018, now Pat. No. 10,705,920.

(60) Provisional application No. 62/577,349, filed on Oct. 26, 2017.

(51) Int. Cl.
*G06F 11/14* (2006.01)
*G06F 16/27* (2019.01)

(52) U.S. Cl.
CPC ...... *G06F 11/1451* (2013.01); *G06F 11/1469* (2013.01); *G06F 16/27* (2019.01); *G06F 2201/84* (2013.01)

(58) Field of Classification Search
CPC .. G06F 11/1451; G06F 11/1469; G06F 16/27; G06F 2201/84
See application file for complete search history.

(56) References Cited

U.S. PATENT DOCUMENTS

| 5,706,509 | A | 1/1998 | Man-Hak Tso |
| 5,778,394 | A | 7/1998 | Galtzur et al. |
| 7,853,561 | B2 | 12/2010 | Olenstein et al. |
| 7,949,640 | B2 | 5/2011 | Olenstein et al. |
| 9,904,721 | B1 | 2/2018 | Olenstein et al. |
| 2009/0106324 | A1 | 4/2009 | Gutlapalli et al. |

(Continued)

*Primary Examiner* — Albert M Phillips, III
(74) *Attorney, Agent, or Firm* — Panitch Schwarze Belisario & Nadel LLP

(57) ABSTRACT

A system and method of backing up an online database to a storage device is provided wherein the online database is actively changed by one or more applications. The backed up online database is then subsequently restored. The online database is backed up by copying the online database to the storage device, and during the copying of the online database, writing changes that are made to the online database to a change log for the portion of the online database that has already been copied to the storage device, and not writing changes that are made to the online database to the change log for the portion of the online database that has not yet been copied to the storage device. The changes in the change log are applied to the storage device by rolling the change log backwards, and applying only the most recent change contained in the change log for each data item in the storage device. The backed up online database is restored by loading the copied plurality of records in the online database from the storage device to a target database.

14 Claims, 9 Drawing Sheets

(56) References Cited

U.S. PATENT DOCUMENTS

2013/0159247 A1    6/2013   Engelko et al.
2015/0193315 A1    7/2015   Cheong

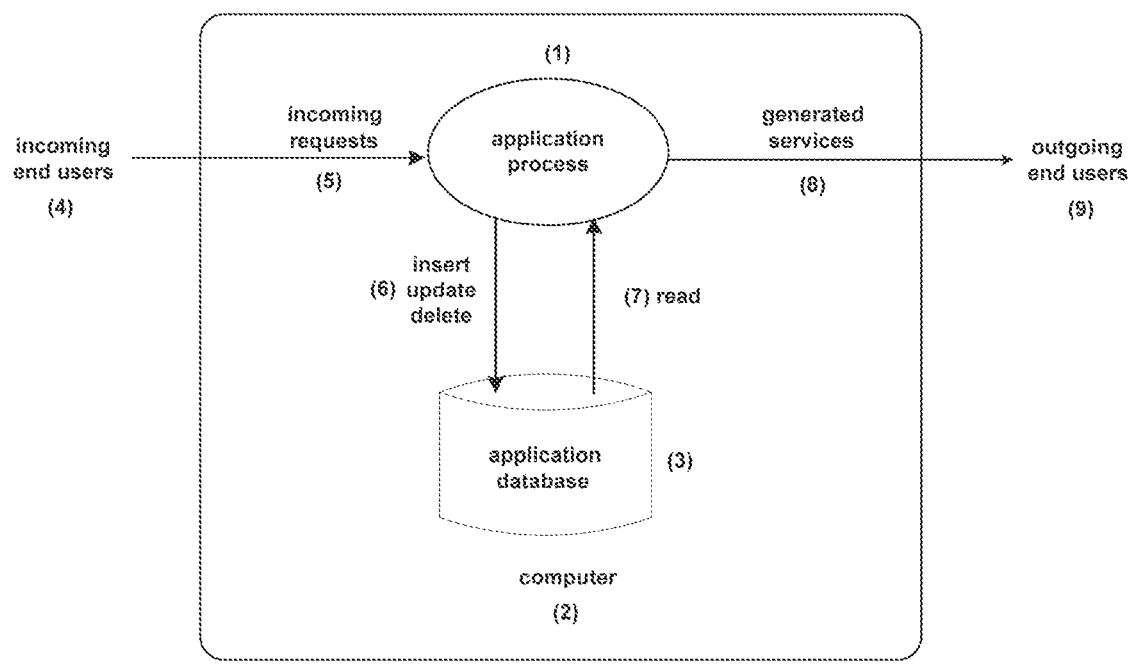
Figure 1: Prior Art - A Computer Application

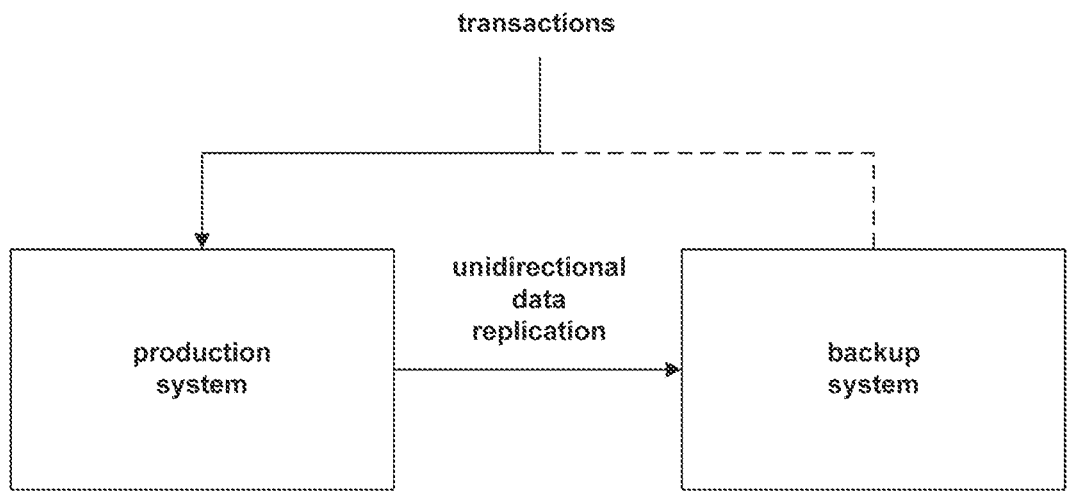
Figure 2: Prior Art - An Active/Backup System
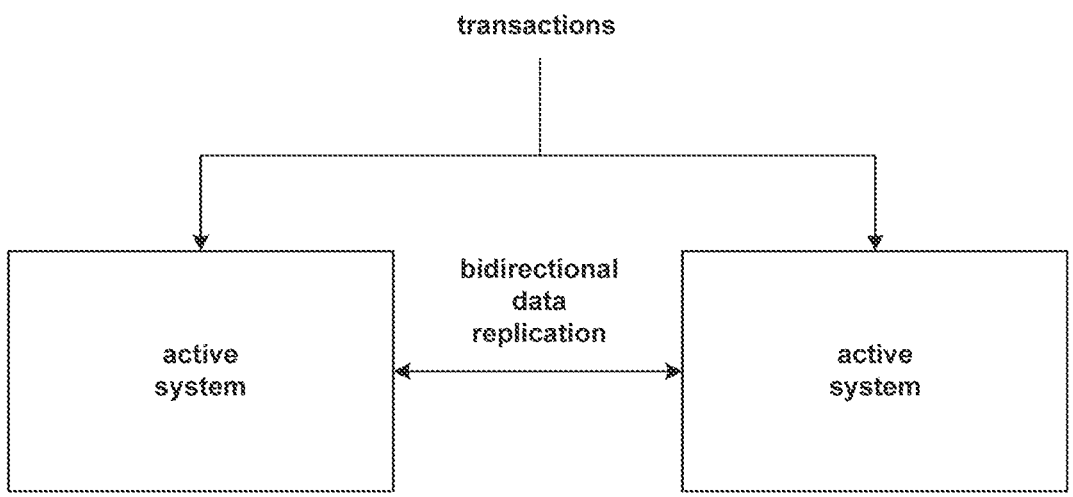
Figure 3: Prior Art - An Active/Active System

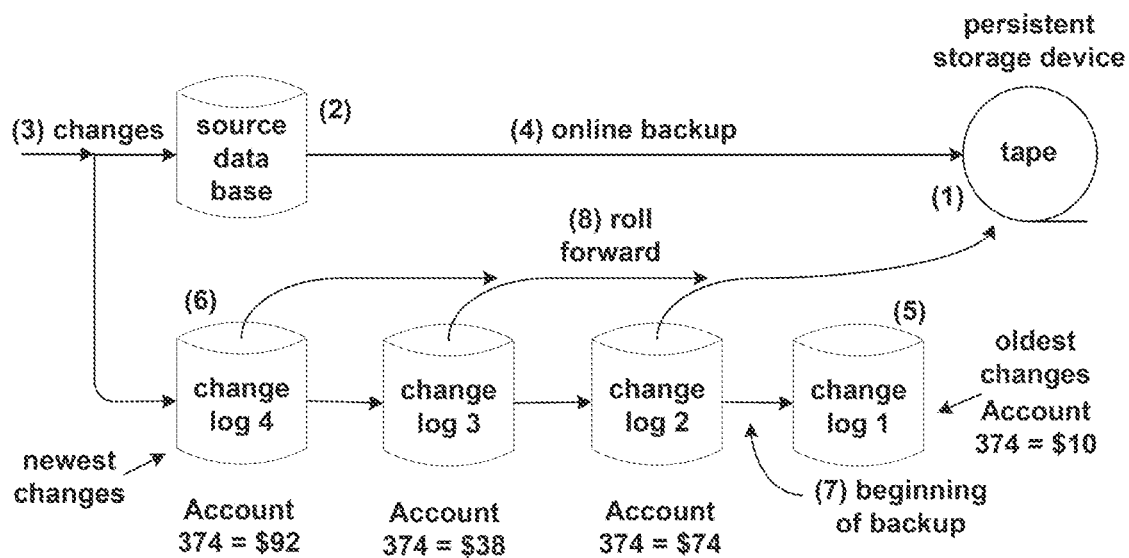
Figure 4a: Prior Art - Traditional Backup Method
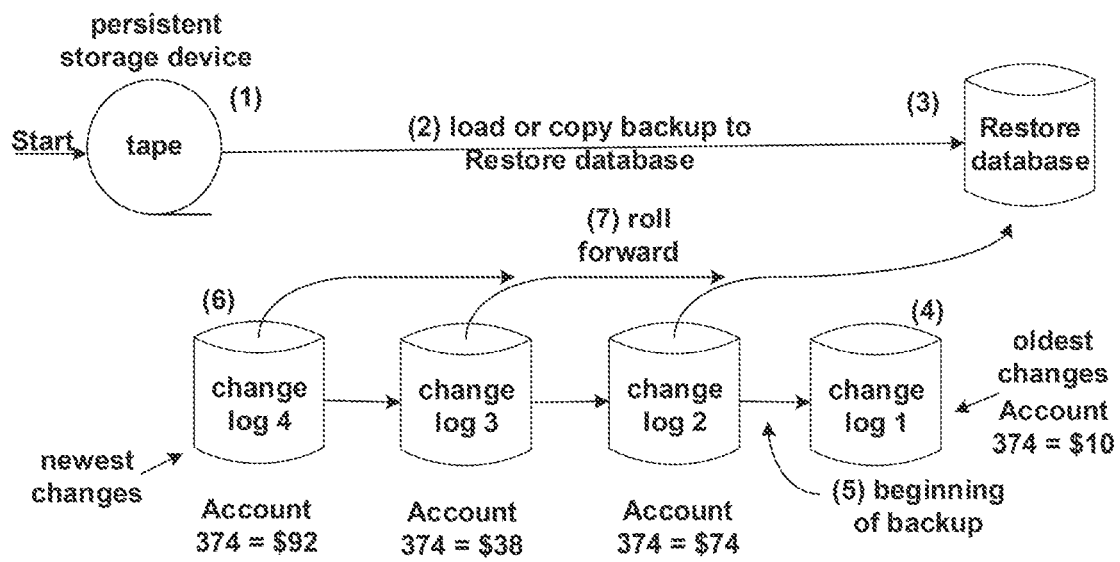
Figure 4b: Prior Art - Traditional Restore Method

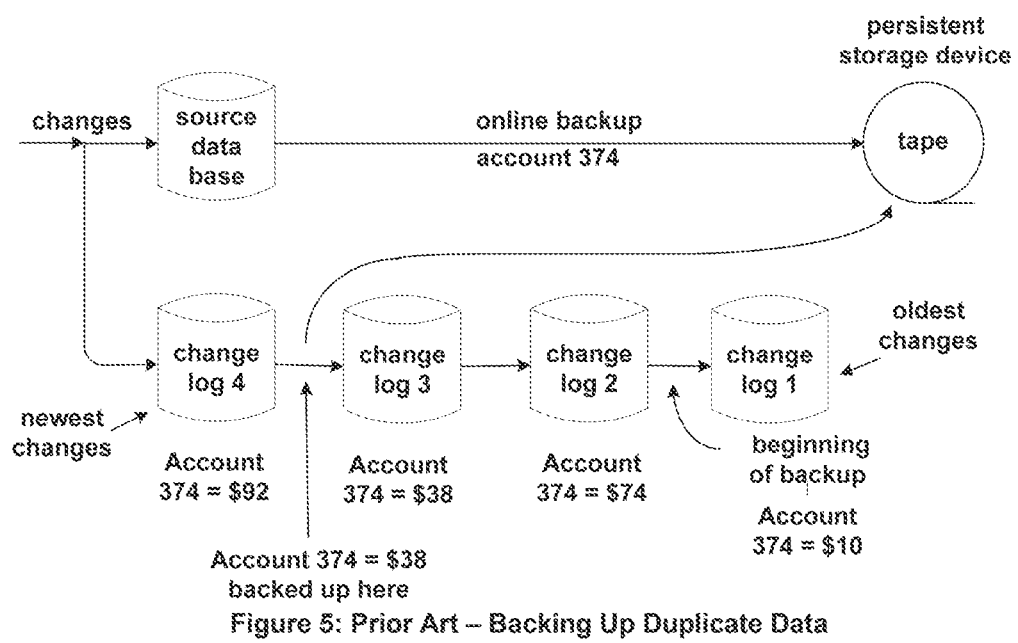
Figure 5: Prior Art – Backing Up Duplicate Data

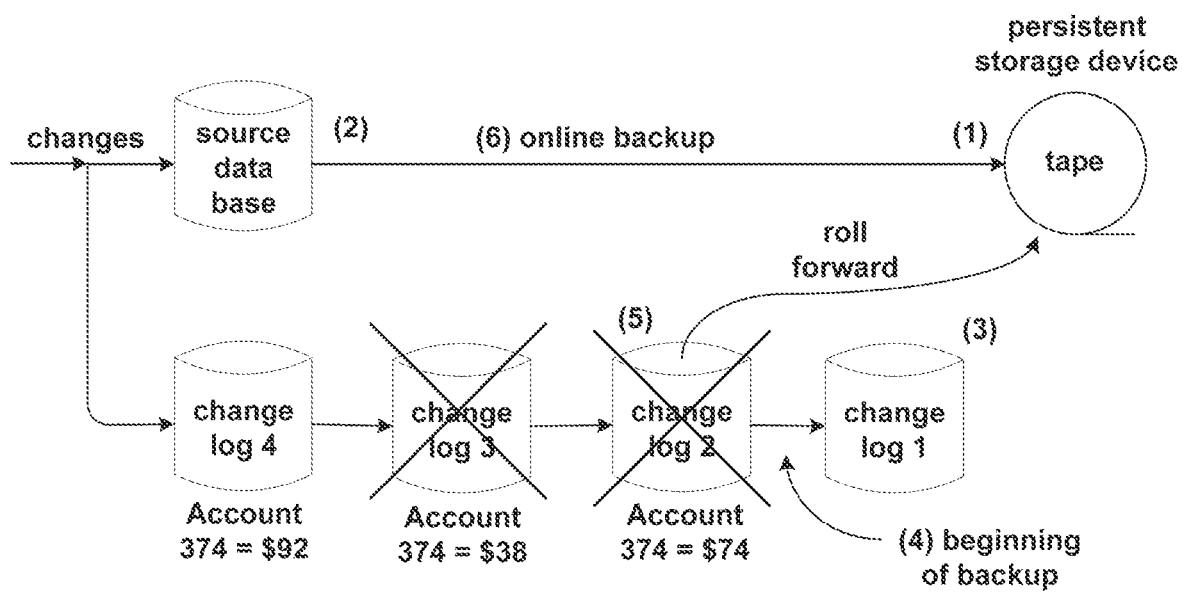
Figure 6: Better Backup Method
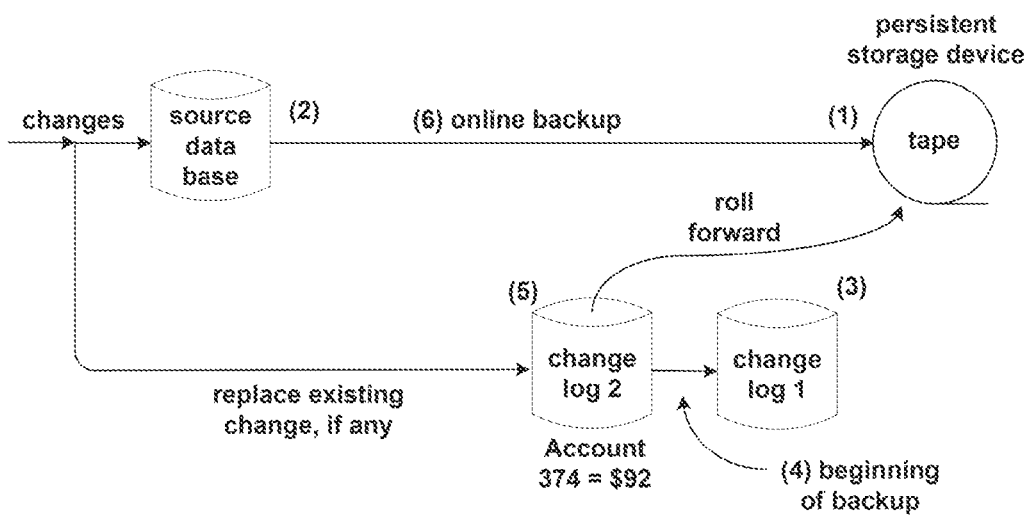
Figure 7: Roll Forward an Existing Change

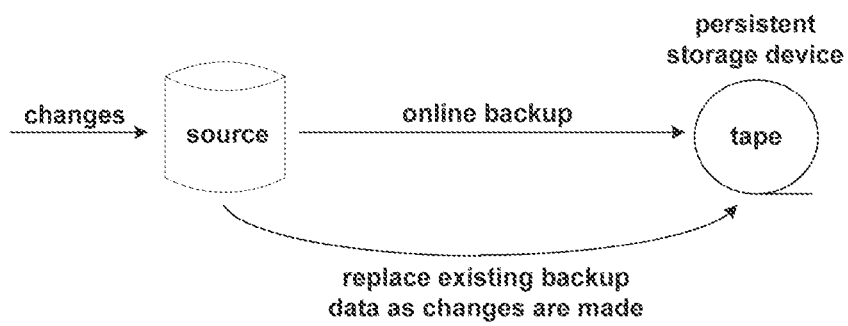
Figure 8: Modify Existing Changes on Tape with New Changes
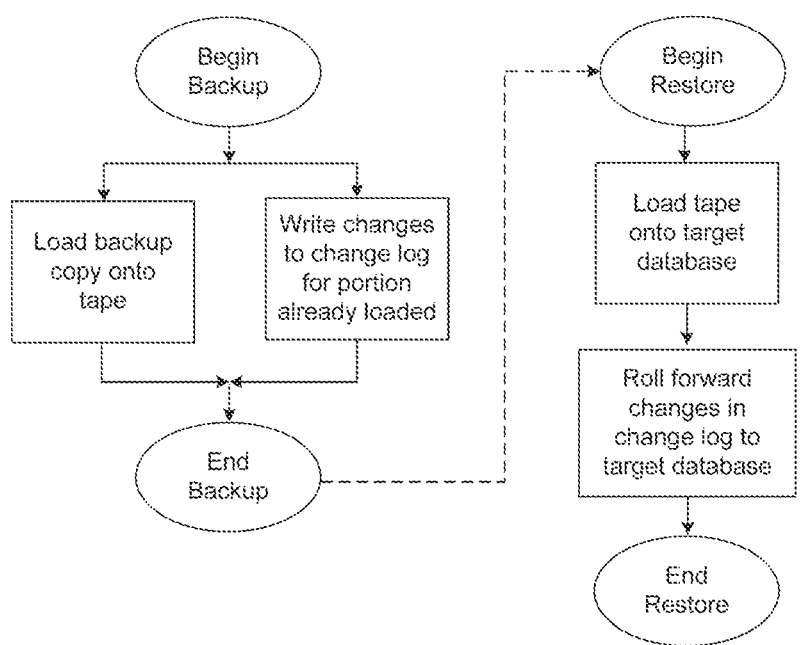
Figure 9: Flow Chart for the Better Backup, Method 1

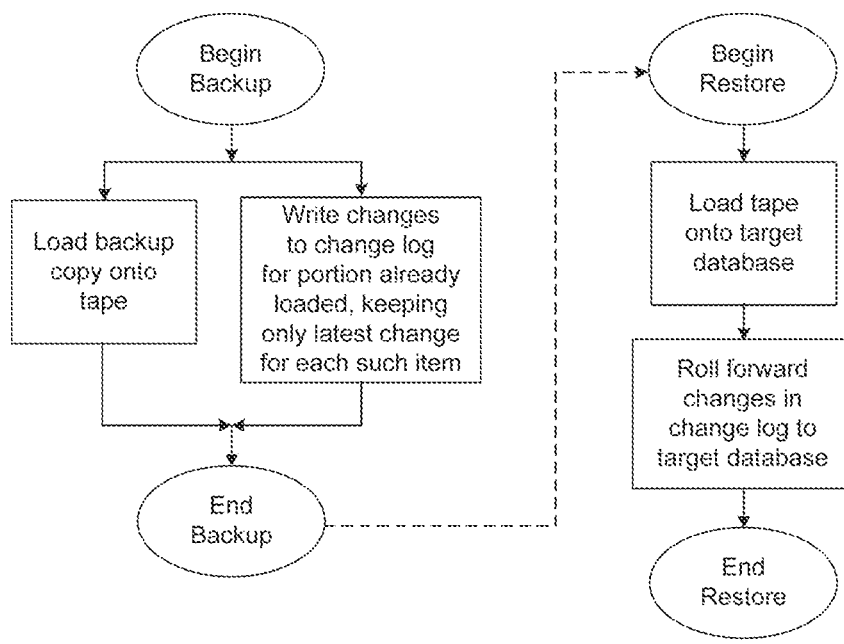
Figure 10: Flow Chart for the Better Backup, Method 2
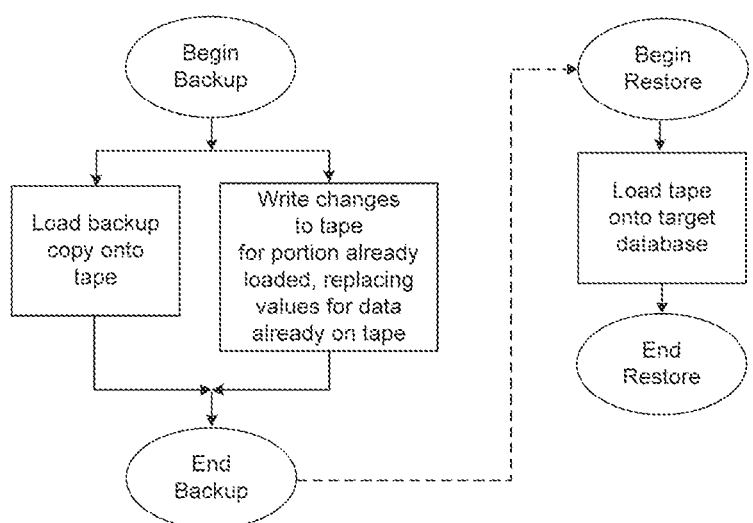
Figure 11: Flow Chart for the Better Backup, Method 3

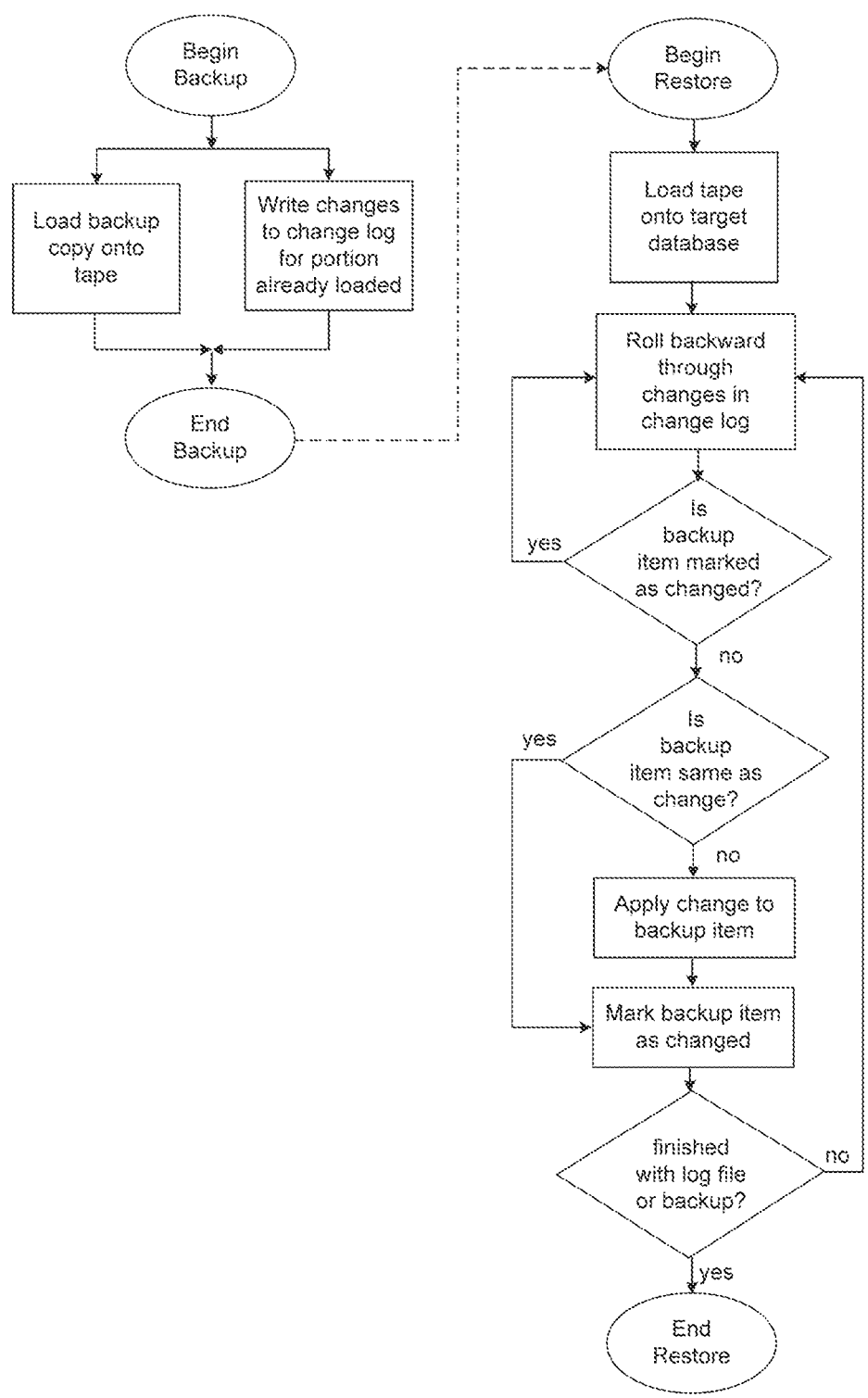
Figure 12: Flow Chart for the Better Backup, Method 4

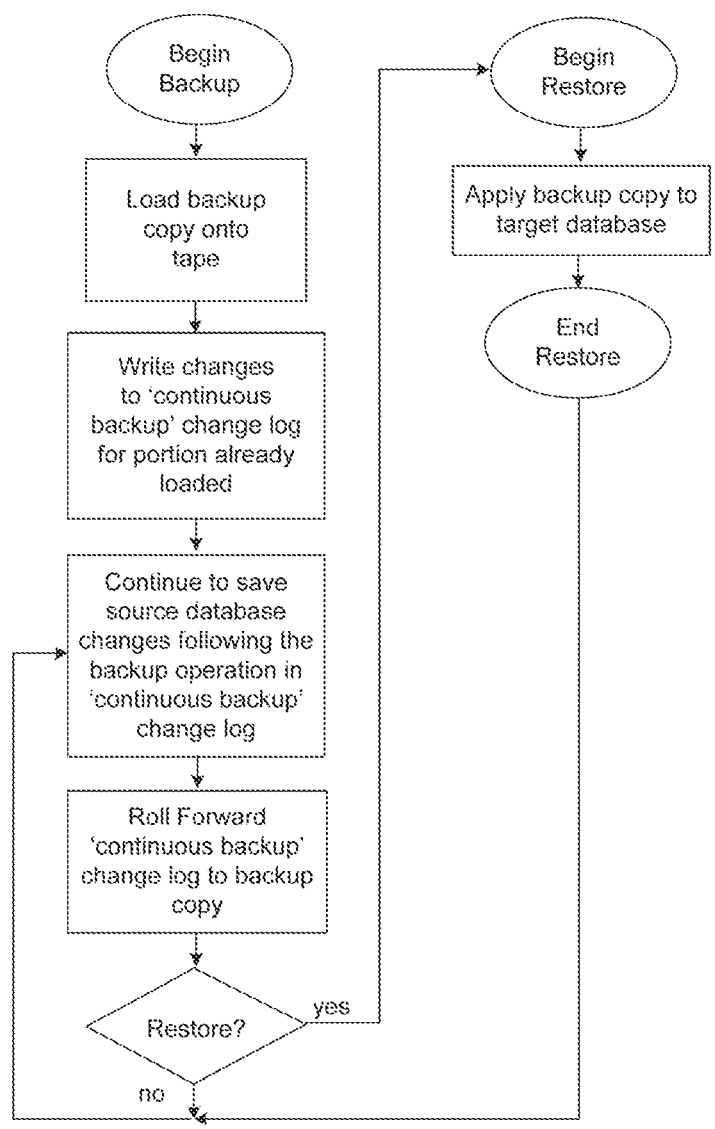
Figure 13: Flow Chart for Continuous Backup

METHOD AND SYSTEM FOR IMPLEMENTING CURRENT, CONSISTENT, AND COMPLETE BACKUP COPY BY ROLLING A CHANGE LOG BACKWARDS AGAINST A STORAGE DEVICE

CROSS-REFERENCE TO RELATED APPLICATIONS

This application is a continuation of copending U.S. application Ser. No. 16/916,815 filed Jun. 30, 2020, which, in turn, is a continuation of U.S. application Ser. No. 16/170,762 filed Oct. 25, 2018, now U.S. Pat. No. 10,705,920. The entire disclosure of both of these applications are incorporated by reference herein.

This application claims priority to U.S. Provisional Patent Application No. 62/577,349 filed Oct. 26, 2017, which is incorporated herein by reference.

BACKGROUND OF THE INVENTION

Certain terms used in the "Background of the Invention" are defined in the "Definitions" section below.

1. Computer Applications

Much of our daily lives is augmented by computers. The many services upon which we depend, our banking, communications, air and rail travel, online shopping, credit-card and debit-card purchases, mail and package delivery, and electric-power distribution, are all managed by computer applications.

In its simplest form, as shown in FIG. 1, a typical computer application is generally implemented as a computer program (1) running in a computer (2). A computer program is basically a set of computer-encoded instructions. It often is called an executable because it can be executed by a computer. A computer program running in a computer is called a process, and each process has a unique identification known to the computer. Many copies of the same computer program can be running in a computer as separately distinguishable processes.

An application typically includes multiple interacting processes.

2. Application Database

With reference to FIG. 1, an application often depends upon a database (3) of information that the application maintains to record its current state. Often, the information in the database is fundamental to the operation of the application, to the decisions it makes, and to its delivery of services to the end users.

The database may be stored in persistent storage such as a disk for durability, it may be stored in high-speed memory for performance, or it may use a combination of these storage techniques. The database may be resident in the same computer as the application program, it may be resident in another computer, it may be implemented as an independent system, or it may be distributed among many systems.

A database generally includes one or more files or tables, though it may be just a random collection of unorganized data. Each file or table typically represents an entity set such as "employees" or "credit cards." A file comprises records, each depicting an entity-set member such as an employee. A table comprises rows that define members of an entity set. A record comprises fields that describe entity-set attributes, such as salary. A row comprises columns that depict attributes of the entity set. In this specification, "files" are equivalent to "tables;" "records" are equivalent to "rows;" and "fields" are equivalent to "columns."

3. Requests

With further reference to FIG. 1, incoming end users (4) generate requests (5) to be processed by the computer application. End users may be people, other computer applications, other computer systems, or electronic devices such as electric power meters. In this specification, the term "end user" means any entity that can influence an application and/or can request or use the services that it provides.

An example of an incoming request from an end user is a request for a bank-account balance. Another example is an alert that a circuit breaker in a power substation has just tripped. In some cases, there may be no incoming request. For instance, a computer application may on its own generate random events for testing other applications.

4. Request Processing

As shown in FIG. 1, the application receives a request from an incoming end user (5). As part of the processing of this request, the application may make certain modifications to its database (6).

The application can read the contents of its database (7). As part of the application's processing, it may read certain information from its database to make decisions. Based on the request received from its incoming end user and the data in its database, the application delivers certain services (8) to its outgoing end users (9).

5. Services

A service may be delivered by an application process as the result of a specific input from an end user, such as providing an account balance in response to an online banking query. Another example of a service is the generation of a report upon a request from an end user.

Alternatively, the application program may spontaneously deliver a service, either on a timed basis or when certain conditions occur. For instance, a report may be generated periodically. Alternatively, an alarm may be generated to operations staff if the load being carried by an electric-power transmission line exceeds a specified threshold.

The end users providing the input to the application may or may not be the same end users as those that receive its services.

6. Availability

The availability of a computer system and the services it provides is often of paramount importance. For instance, a computer system that routes payment-card transactions for authorization to the banks that issued the payment cards must always be operational. Should the computer system fail, credit cards and debit cards cannot be used by the card holders. They can only engage in cash transactions until the system is repaired and is returned to service.

The failure of a 911 system could result in the destruction of property or the loss of life. The failure of an air-traffic control system could ground all flights in a wide area.

In mission-critical systems such as these, it is common to deploy two or more computer systems for reliability. Should one computer system fail, the other computer system is available to carry on the provision of services.

7. Redundant System

The availability of a computing system can be significantly enhanced by providing a second system that can continue to provide services to the end users should one system fail. The two systems are often configured as an active/backup system or as an active/active system, although other configurations are also possible. The systems are interconnected via a computer network so they can interact with each other.

In an active/backup system (FIG. 2), the active system is keeping its backup system synchronized by replicating database changes to it so that the backup system is ready to immediately take over processing should the production system fail.

In an active/active system (FIG. 3), both systems are processing transactions. They keep each other synchronized via bidirectional data replication. When one system processes a transaction and makes changes to its database, it immediately replicates those changes to the other system's database. In that way, a transaction can be routed to either system and be processed identically. Should one system fail, all further transactions are routed to the surviving system.

8. Non-Redundant System

In some environments, a second system is not immediately available. Rather, if there is a failure of the computer system, a second system is procured and the application and data are loaded onto it.

9. Online Backup of an Active Database

All of the services that a system provides to its users are generally determined by the data it is processing and may have stored. It is therefore imperative to protect that data from loss due to hardware failure, software failure, human error or malfeasance, or any other fault condition. For example, if an operator accidentally deletes an important file, that file will disappear from the primary system and, if replication is configured and operational, the replication engine will dutifully delete the file from the backup system.

Consequently, it is common practice to periodically back up the data onto a medium such as magnetic tape, virtual tape (magnetic tape images typically stored on disk, which may be remotely located), cloud infrastructure, solid-state storage, or other persistent storage as shown in FIG. 4a (1). Throughout this specification, the use of the phrase 'tape' for the backup copy medium is meant to include all of these storage medium locations and technologies and is not meant to limit the reference to just classic electronic tape technologies. The use of the word 'tape' implies a persistent storage device.

Such a backup is commonly known as a 'dump' of the data. Generally, a backup is taken of a source database (2) while it is actively supporting transaction processing (3). Thus, the source database is changing as the backup takes place. This is known as an online backup or an "online dump" (4). The source database (2) is thus an "online database."

The problem with an online backup is that it takes time to complete, and changes are occurring to the database during this time. Changes to the database are captured only for data that has not yet been written to the backup medium. Data written early in the backup phase is missing subsequent changes, but data written later in the backup contains more of the changes. The data in the backup is therefore inconsistent.

10. Database Restore from an Online Backup

In order to restore a consistent (e.g., from a relational perspective, logically complete and usable to applications) database on a target system, the changes that are occurring during and following the backup must be written to a persistent change log such as an audit trail, a redo log, a journal, or equivalent data structure. In FIG. 4a, the oldest changes have been written to Change Log 1 (5) and the newest changes to Change Log 4 (6).

The restore process is shown in steps (7) and (8). This typically involves marking the persistent change log (or backup copy) via various methods to note the time or relative position in the change log at which the backup began (7). The database is restored onto the target system to create the "restore database" (interchangeably referred to as the "target database") by loading the backup copy (or "online backup"), or dump, from the persistent storage device onto it, and the pertinent change logs are rolled forward (8), in order, to apply the changes that occurred after the backup started in order to make the target database consistent and complete. This sequence is usually executed without any user access to the data while it is being restored and rolled-forward, often because the data is old and out of date, it may be inconsistent, and the restore operation can often be performed much faster using bulk apply methods when no user access is allowed.

FIG. 4b describes in more detail a typical restore process to further show the sequence of steps used to create the restore database, and then roll it forward to bring it consistent and complete. In this figure, the backup copy is copied or loaded (2) from the persistent storage device (1) onto the restore database (3), and then the change logs are rolled forward (4), in order, to apply the changes that occurred after the backup started in order to make the target database consistent and complete. Note that since change log 1 (4) was created before the beginning of the backup (5), it would typically be skipped (not rolled forward). (If it is rolled forward, it will typically just make the target database inconsistent while it is being rolled forward.) Change logs 2, 3, and 4 (6) were created after the backup was originally started/taken, so they would normally be rolled forward (7) and applied into the target database (restore database) to make the target database consistent and complete.

In FIG. 4a, the pertinent change logs are Change Logs 2, 3, and 4 (Change Log 1 was created before the backup began, and its changes are already reflected in the source database, and were captured by the backup operation, at the time the backup began). Therefore, in FIG. 4a, once the backup copy has been loaded onto to the target database, the changes in Change Logs 2, 3, and 4 must be applied to the target database to bring it current and to a consistent state—consistent and current at least to the time that the backup operation ended as additional changes are likely being made to the source database after the backup ended.

A problem with this technique is that several change logs may be required to hold the changes that occurred during the backup. For a very active source application with many changes occurring per second, there may be many such change logs required to hold all of the changes that occurred during the backup.

For instance, as shown in FIG. 4a, Account 374 is initially backed up with an account value of $10. This change was made in log file 1, which occurred before the backup began. Account 374 is subsequently updated to $74, then $38, and finally to $92; this sequence is reflected in the log files. These will also be the values that are applied to Account 374 as the roll forward takes place. More specifically, the restore will write out the initial value of account 374 from when the original backup was taken ($10). The log files will then be replayed in succession, starting with log file 2, then log file 3, then log file 4 as shown in FIG. 4a. Unfortunately, this will replay the old values for this account before ultimately ending at the correct account value of $92.

Furthermore, as shown in FIG. 5, many of the changes that occur during the backup operation may have been captured already by the backup if they occurred after the backup operation started but before those particular data objects (or part of the database) were copied to the backup medium. These changes are thus a duplicate of data that has already been backed up. Worse, there could be a series of changes to the same data that occurred after the backup began but before that data was subsequently backed up, and rolling forward thru those changes will actually cause the restored data to reflect older (and inconsistent) values while it is being rolled forward, as shown in FIG. 5. For instance, as shown in that figure, Account 374 starts off at $10 when the backup starts, is updated to $74, then $38, and finally to $92; however, it isn't backed up until its value is $38, represented by the change that was captured in log file 3.

Using the prior art method of restore and roll forward, account 374 will initially be restored as $38, but then it will be updated to old account values ($74 in log file 2, then $38 in log file 3, then $92 in log file 4) while all of the log files are processed.

Consequently, restoring a backup requires rolling forward through several change logs, which may take a great deal of time and consume a great deal of storage medium resources for all of the change log files. Furthermore, rolling forward thru all the changes that occurred during the backup will make the restored data out-of-date and inconsistent until the final set of changes are replayed from the log file(s).

Additionally, during this process, the source database is still being updated; and these changes must also be logged and rolled forward to update the restored backup to a current and consistent state as of the time period when the backup operation ended.

11. Oracle Snapshots

Oracle uses snapshots to replicate data to non-master sites in a replicated environment. A snapshot is a prior art replica of a target master table from a single point in time. Snapshots are updated from one or more master tables through individual batch updates.

A snapshot allows one to go back in time to earlier values in the database—specifically at the snapshot time. To do this, the current database is basically UNIONed with (or overlaid by) the snapshot database, using the values from the snapshot database to replace the current values in the current database. In this approach, the snapshot database holds the original value (as of the snapshot time) of the data element(s) that have subsequently changed over time. Note that new data elements added after the snapshot time will not be reflected in the snapshot image of the database, and data elements removed since the snapshot time will still be reflected in the snapshot image of the database.

Note that whereas the snapshot approach allows one to go back to prior values of the database, the current invention allows one to go forward from the prior (and possibly inconsistent) values of the database to the latest (and optionally consistent) values of the database.

12. What is Needed

What is needed is a means for backing up a database and for restoring it to a consistent state (for instance, every child row has a parent row) with a minimum of change logs so that the restoration of a backup can be executed as quickly as possible, the change logs can consume as little of the storage medium as possible, and the target data is kept as consistent as possible while the restore is taking place.

Since there may be additional changes made to the source database after the time that the backup operation ended, it is also desirable to save these additional changes so that the backup information can continue to remain consistent, complete, and current as of the current state of the source database from that point forward. This is referred to as creating and maintaining a "Continuous Backup".

SUMMARY OF THE PRESENT INVENTION

Periodically, it is necessary to create a backup copy of a database while it is being actively updated. The changes that occur during the backup must also be preserved such that the restore can leave the restored database in a consistent and current state. These changes are preserved in change logs or similar persistent storage.

When making the backup, it is not necessary to save changes for data that has not yet been backed up. These changes will be read from the database and applied into the backup copy when the backup is made. Hence, the present invention creates a backup and logs only those changes that need to be applied to restore the database to a consistent state (in other words, while the backup occurs, only the changes that have occurred for objects that have already been backed up are saved in the change logs).

Similarly, it is not necessary to save all changes, or even the sequence of changes made since the data was backed up. We only need to save the last value of the data while the backup is made. Hence, an alternate embodiment of the present invention creates a backup and only one change log—to hold the last change made to any object that was updated while the backup occurred. In another alternate embodiment to this invention, the changes that occurred while the backup operation occurred are overlayed directly on the backup data (i.e., directly on the backup copy of the data that is on the persistent storage device). Consequently, no change logs are necessary and no roll forward operation need take place after the backup is restored.

In another embodiment of the present invention, the backup and log files are created as in the prior art. However, the restore process rolls backwards through the log files and only restores the last image (or most recent image) for any item found. If the after image in a log file matches the backup image, then modifications to that data item are complete since the backup was taken after that change was made. If the after image in the log file does not match the backup image, the after image in the log file is applied to the backup; and that data item is marked as complete. Log file (change) events for any items in the backup that have already been processed (marked as complete) are ignored. When all items in the log file have been read, or when all items in the backup have been so marked, the restore is complete.

In an additional embodiment of the present invention, changes to the source database made after the backup has been completed are saved to persistent storage. This is the 'continuous backup' method. With this method, the backup copy is consistent, current, and complete from the point of the backup operation going forward, and it remains that way as subsequent changes are made to the source database.

Normally, the source or online database being backed up is a separate, different database than the restore, or target database. This is common when a consistent and complete copy of the source database needs to be loaded onto a new target database. However, in some cases, the restore database can replace or overlay the original source database, for example if the source database became damaged or suffered data loss or otherwise became corrupted (or was otherwise suspected to be affected by these issues). This might be done, for example, to restore the source database to a known point (a known data consistency), and then to enable further application processing against that source database as part of a source environment recovery effort.

In some cases, the restore process or sequence can be initiated before the backup operation completes. This is common for large databases in order to reduce the overall time it takes to create a consistent backup while restoring it onto the restore database as the various steps (such as the backing up of the source database and the restoring of the backup onto the restore database) can be accomplished in parallel for different parts of the database.

Online backups can be speeded up by not saving changes to data that has not yet been backed up. This eliminates the need for multiple change logs and saves the time required to roll their changes forward to the backup copy. It also improves database consistency while the restore takes place. Consequently, online backups and restores from these backups are much faster, require less log file space to hold the change data, and they return the restored database to a consistent state much faster than previous restore/roll-forward methods. When taken to the extreme, the backup copy is kept current and consistent with the database continuously, allowing a database restored from the backup copy to immediately be current and consistent, thereby avoiding the need to roll forward with any database changes once it is restored.

BRIEF DESCRIPTION OF THE DRAWINGS

Preferred embodiments of the present invention will now be described by way of example with reference to the accompanying drawings:

FIG. 1 shows a prior-art computer application.

FIG. 2 shows a prior-art active/backup system with nodes connected by a computer network.

FIG. 3 shows a prior-art active/active system with nodes connected by a computer network.

FIG. 4a shows a prior-art traditional backup method.

FIG. 4b shows a prior-art traditional restore method.

FIG. 5 shows the prior-art method of backing up duplicate data.

FIG. 6 shows the Better Backup method in accordance with one preferred embodiment of the present invention.

FIG. 7 shows the rolling forward of an existing change.

FIG. 8 shows modifying existing changes on a persistent data sore with new changes.

FIG. 9 shows a flow chart for the Better Backup method 1.

FIG. 10 shows a flow chart for the Better Backup method 2.

FIG. 11 shows a flow chart for the Better Backup method 3.

FIG. 12 shows a flow chart for the Better Backup method 4.

FIG. 13 shows a flow chart for Continuous Backup.

DETAILED DESCRIPTION OF THE INVENTION

Certain terminology is used herein for convenience only and is not to be taken as a limitation on the present invention.

The words "a" and "an", as used in the claims and in the corresponding portions of the specification, mean "at least one."

Definitions

The following definitions describe the use of certain terms in this specification and are provided to promote understanding of the present invention. They are hierarchically ordered in that each definition builds on previous definitions.

Table—A set of data values that is organized using a model of horizontal rows and vertical columns. The columns are identified by name, and the rows are uniquely identified by the values appearing in a particular column subset (the table's primary key). A table usually characterizes an entity set. Each row in the table describes an instance of the entity set. Each column describes an attribute of the entity set.

File—The equivalent of a table for nonrelational databases. A file is made up of records, and each record describes an entity instance. A record is made up of fields, each of which describes an attribute of the entity set. In this specification, the term "table" or "file" is to be interpreted as "table and/or file."

Column—A table component that holds a single attribute, such as SALARY, of the entity set.

Field—A file component that holds a single attribute, such as SALARY, of the entity set. In this specification, the term "column" or "field" is to be interpreted as "column and/or field."

Row—A table component that represents an entity instance. It is a sequence of {column name, value} pairs usually implemented as a sequence of values positioned according to their corresponding column names. For instance, (EMPLOYEE NUMBER, 235), (NAME, Joe Smith), (DEPARTMENT, Accounting), (SALARY, $30,000).

Record—The same as a row, but "row" is usually used for relational databases; and "record" is usually used for file systems. In this specification, the term "row" or "record" is to be interpreted as "row and/or record."

Database—A collection of related tables or files.

Insert—The addition of a row into a database.

Update—The modification of a row in a database.

Delete—The removal of a row from a database.

Change—An insert, update, or delete.

Function—A logical implementation of a task or service.

Program—An executable set of programming code for providing a specific function or set of functions.

Executable—A program.

Processor—one or more hardware or software entities or objects that execute program steps or sequences serially or in parallel to accomplish a task or series of tasks. The processor may encompass a single core of a CPU or multiple cores in multiple CPUs or multiple cores executing in nodes of a system or virtual machine.

System—A processor with memory and input/output devices that can execute a program.

Backup and Restore Processor—a backup and restore processor as used herein is a processor that accomplishes the following steps or tasks: copying data from an online database to a persistent storage device, writing changes made to an online database to a change log, loading the copied data from the persistent storage device to a restore database, and applying the changes in the change log to the restore database.

Computer—A system.

Node—A computer that is one of the two or more nodes, i.e. systems, that is making up a redundant system.

Process—A program running in a computer. A process provides one or more functions. One program can be spawned as multiple distinguishable processes.

Application—One or more processes cooperating to perform one or more useful functions for end users.

Operating System—A software facility that manages computer hardware resources and provides common services for application processes. Services include time functions, reading and writing interprocess messages, and database manipulation.

End Users—People, systems, devices, applications, or any other entity that can influence an application or can request or use the services that it provides.

Active/Backup System—A redundant system architecture in which an active production system is backed up by a passive system that may be doing other work. Should the active system fail, the backup system is brought into service; and the application continues running on the backup system. Failover from a failed active system to the backup system can take some time, ranging from minutes to hours. Furthermore, the failover may not work (a failover fault).

Active/Active System—A redundant system architecture in which two or more computing systems are actively processing transactions for the same application. Should one system fail, recovery only entails sending further transactions to the surviving system(s). Failover typically can be accomplished in seconds, and there are no failover faults (the surviving systems are known to be working).

Redundant System—A system architecture which consists of two or more systems (i.e. nodes) that are operating in a way to increase the overall availability of the application to end users. Active/Backup and Active/Active Systems are the two primary redundant system architectures.

Sizzling-Hot Takeover (SZT) system—An active/active architecture in which only one computing system is processing transactions. An SZT system avoids the problems that an application might face if run in a distributed environment, but it has the fast and reliable failover characteristics of an active/active system.

Backup—Creating a copy of a database to protect it from loss. Database in this context can refer to the classic definition of files and tables, as well as a collection of any objects, data or otherwise, that change over time. For example, a backup can be a copy of a database, or a copy of a virtual machine environment in a cloud infrastructure, or a copy of any other information that changes over time.

Online Backup—Creating a copy of an active database to protect it from loss.

Restore—Restoring a database in a consistent state by loading a backup copy and rolling forward changes that occurred to the backup copy once the backup was started but before it was completed. In some cases of the present invention, the roll forward operation will continue even after the backup copy has been made to make sure the restore operation will return the restored database to a current state (more recent or latest version of the data) rather than a prior state (earlier version of the data).

Log File—a file or other repository for holding the changes made to records or rows (or other objects) in a database. The log file usually contains the before and/or after image of the change made. For example, for an insert the log file holds the after image; for an update the log file holds the before and after images; for a delete, the log file holds the before image. The log file can be used to roll a backup copy forward, applying the after images, to apply the changes made since the backup copy was created. The log file can also be used to undo changes made to a record or row (or other object) by undoing the change and re-applying the before image.

Persistent Data Store—A data storage device or technology that will not lose data if it is powered down.

Storage Media—a persistent data store that can be randomly and/or sequentially accessed.

Tape—historically used to reference magnetic tape technologies. However, in this specification, the phrase 'tape' is expanded to reference other storage media such as virtual tape, solid state devices, cloud storage, and other persistent storage media that may be randomly and/or sequentially accessed. The word 'tape' is to be interpreted as 'storage media'.

Virtual Tape—Magnetic tape images on a disk, which may be remote from the source system.

Consistent Database—A database (or other set of data, such as a backup copy or dump) is consistent if its data is valid according to all defined rules. For instance, a parent row must exist for every child row that refers to it, or the sum reflected in an account balance should match the sum of the transaction detail records that have updated that quantity.

Current Database—A database (or other set of data, such as a backup copy or dump) is current if it reflects the values of the source data at the present time.

Complete Database—A database (or other set of data, such as a backup copy or dump) is complete if it reflects all of the values of the source data at a particular time.

1. The Better Backup Method—Database Backup

The Better Backup method is shown in FIG. 6. It is similar to the traditional backup method shown in FIG. 4*a* in that the contents of the source database (2) are written to a backup medium (1). The backup medium is typically magnetic tape, virtual tape, or another form of persistent storage such as solid-state storage (for example, a thumb drive).

2. The Better Backup Method—Change Logs

Since the source database is being actively updated, restoring it from the backup medium does not provide a consistent database since changes made to that portion of the source database that has already been backed up are not included in the backup copy. These changes must be captured in a change log and applied to the restored version in order to make it consistent, current, and complete.

The present invention recognizes that changes for data that has not yet been backed up do not have to be written to a change log. These changes will have been made to the data in the source database and will be carried to the backup medium when they are written to that medium as part of the backup operation. Thus, the consistency of the backup database is preserved without having to roll forward these changes.

3. The Better Backup Method—Database Restore

During the restore process, the changes that have been captured in the change logs must be rolled forward to the restored copy of the backed-up database.

In FIG. 6, Change Log 1 (3) contains changes that were made to the source database before the backup began (4). Therefore, its contents do not have to be rolled forward to the backup copy of the database. However, Change Log 2 (5) contains some changes that were made to the source database following the initiation of the backup; and these changes must be rolled forward to the restored backup copy to make the database consistent. Once the changes have caught up with the online backup, there is no further need to log changes and to roll them forward. All changes to the source database will be included in the online backup data stream (6), guaranteeing the consistency of the backup database. Therefore, Change Logs 3 and 4 (and perhaps some changes in Change Log 2) in FIG. 6 do not have to be created nor applied to the backup.

Observe that during the restore process, the database is not in a consistent state. It is made consistent once all of the changes in the change log have been rolled forward to it. Thus, the restored database is 'eventually consistent, current, and complete.'

It is important to note that the data being restored is not going to go back to previous values during the restore process. For instance, assume the backup begins at time T1, and data D1 is changed after T1 to D2, then to D3, then to D4. This data object is backed up at time T2 when its value is D2. The classic approach would be to backup D2, then roll forward changes setting it to D1, then D2, D3, and finally D4. Thus the database is very inconsistent during the restore process and in fact has been rolled back to a previous value when D1 is applied.

One alternative embodiment approach is to capture the database at D2 and not replay the D1 or D2 audit, just the D3 and D4 changes. Over time, the database is consistent. It just resets to older values than the final value but not older values than the initial value.

Another alternative embodiment approach is to capture D2 and then overlay it with D3 and later D4 before beginning the restore process.

The consequence of this invention is that only a portion of the change logs that would be required under the Traditional Backup Method are needed for the Better Backup Method. The fewer the change logs, the less processing is required to create them and the less storage is required to save them. Perhaps even more important, the fewer the change logs, the less time is required to roll them forward, and the online backup/restore processes becomes much faster. Additionally, the restored data goes thru fewer, and in some embodiments no, data consistency issues while it is being restored and made current and complete.

In order to implement the continuous backup method, changes made to the source database after the backup has been completed are saved in an ongoing change log. By rolling forward these changes at some later time to the backup, the backup can be made consistent, current, and complete at any future point in time.

4. Performance Improvements

An improvement in performance can be achieved by saving only the last change to a specific data object that is being modified multiple times, as shown in FIG. 7. If a change is made to a data object that has previously been changed, the first change can be located in the change log and replaced with the new change. If the first change has already been backed up, it can be located on the backup medium and replaced with the new change.

Alternatively, changes to data that has already been backed up can be made directly to tape (the backup medium) as shown in FIG. 8. This method eliminates the need for change logs and roll-forward operations.

Another potential performance improvement can be achieved by processing the source database physically, block by block (or blocks of data by blocks of data), rather than logically by ascending key path or some other logical order to access the rows or records (or columns or fields) of data. This can make the determination of whether to save a change that has occurred since the backup began much faster and easier since the backup will be much faster. More specifically, using a physical path (such as the physical order the blocks of data appear in the file) to access the data is often much faster than using a logical path (such as an index tree that points to the rows or records) to access the data.

It is also important to note that the rows or records (or blocks of data) are what is typically stored in the change log as the online database is updated. In some cases, the change log consists of statements and/or operations that have been applied to the source database (online database). For example, when a row or record (or the data in a block) is changed (or a statement or an operation is executed against the online database), the change log will often include either (or both) the data item's before image and/or the after image of the change. The before image reflects that data value(s) before the change is made, and is typically listed for updates and deletes, for example. The after image reflects the data value(s) after the change is made, and is typically listed for the inserts and updates, for example. If the change log holds statements and/or operations, the change log may just include the statements and/or operations themselves, and/or the before and/or after images of the individual rows or records (or blocks of data) that have changed. The database management system is often tasked with the level of information to store in the change log (statement level, operation level, row or record level, or data block level).

Regardless, the change log contains the series of changes that have been made to the online database's data. During a restore operation, rolling forward thru these changes and applying them on the restore database (which itself was created from the online backup) brings the restore database current, consistent, and complete.

5. Flow Chart for the Better Backup Method 1

A flow chart for the Better Backup Method 1 is provided in FIG. 9. As the backup copy is being loaded from the database onto tape, changes that arrive for that portion of the backup that has already been loaded are saved in a change log.

To restore the database, the tape backup copy is loaded onto the target database. The changes in the change log are then rolled forward to the target database.

6. Flow Chart for the Better Backup Method 2

A flow chart for the Better Backup Method 2 is shown in FIG. 10. As the backup copy is being loaded from the database onto tape, changes that arrive for that portion of the backup that has already been loaded are saved in a change log. However, only the latest or most recent change to a particular data item is saved. If a change already exists for that data item, it is overwritten with the newer change. This reduces the number and size of the change logs that have to be saved and that will be used during the restore process.

The better backup methods can be extended by continuing to save only the latest, or most recent, change to the change log even after the backup operation completes. This approach will continue to keep the change log with only the most recent change for any part of the online database that continues to change.

To restore the database, the tape backup copy is loaded onto the target database. The changes in the change log are then rolled forward to the target database. Since the change log contains only one change (the latest change) to any data item in the backup, the roll-forward operation is much faster than that of Better Backup Method 1.

7. Flow Chart for the Better Backup Method 3

A flow chart for the Better Backup Method 3 is given in FIG. 11. While the backup copy is being loaded to tape, any changes that arrive for that portion of the backup that has already been loaded replace the earlier values directly on tape.

To restore the database, the tape is simply loaded onto the target database. This method eliminates the need for a change log and a subsequent roll-forward operation, thus speeding up the tape restore process.

8. Flow Chart for the Better Backup Method 4

A flow chart for the Better Backup Method 4 is shown in FIG. 12. While the backup copy is being loaded to tape, any changes that come in for that portion that has already been loaded are saved in a change log.

To restore the database, the tape backup copy is loaded onto the target database. Once the backup has been loaded, the change log is rolled backwards, thereby providing the latest (most recent) changes first.

For each change in the change log, the corresponding item in the backup copy is checked. If the backup copy data item has been marked as having been changed by a change from a change log already, the change from the change log is ignored. If the backup copy data item has not been marked as having been changed, but the change is the same value as that in the backup copy, the backup copy data item is marked as having been changed. If the backup copy data item has not been marked as having been changed, and the change is different than the value in the backup copy, the change is applied to the backup copy; and the backup copy data item is marked as having been changed.

This process continues until all changes in the change log have been processed or until all items in the backup copy have been marked as changed. At that time, the backup copy is fully consistent with all of the change log changes as of the end of the original backup time period.

9. Flow Chart for Continuous Backup Method

A flow chart for the Continuous Backup method is shown in FIG. 13. This method provides the capability to continue to save further changes made to the source database in a persistent change log. As the backup copy is initially copied to tape, any changes that were made to the portion that was already copied are written to the 'continuous backup' change log. Thereafter, all further changes to the source database are also written to the continuous backup change log.

By rolling forward the changes in the continuous backup change log to the backup copy, the backup copy becomes consistent, current, and complete at that (and every) point in time.

When it is desired to restore the target database, the backup copy is simply written to the target database to bring it consistent, current, and complete.

The backup and restore processor described in the Definitions section above performs the steps shown in the systems of FIGS. 6, 7, and 8. Similarly, the backup and restore processor also performs the steps shown in the flowcharts of FIGS. 9, 10, 11, 12, and 13.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method of backing up an online database, the online database being actively changed by one or more applications, and subsequently restoring the backed up online database, the online database including a plurality of records, the method comprising:
(a) backing up the online database by:
(i) copying the plurality of records in the online database to a storage device, and
(ii) during the copying of the plurality of records in the online database to the storage device, writing changes that are made to the plurality of records in the online database to a change log for a portion of the plurality of records in the online database that has already been copied to the storage device, and not writing changes that are made to the plurality of records in the online database to the change log for a portion of the plurality of records in the online database that has not yet been copied to the storage device; and
(b) applying the changes in the change log to the storage device by rolling the change log backwards, and applying only the most recent change contained in the change log for each data item in the storage device, wherein the change log includes one or more rows, records or blocks of data that have been changed; and
(c) restoring the backed up online database by loading the copied plurality of records in the online database from the storage device to a target database, wherein the target database is a distinct storage entity from the storage device.

2. The method of claim 1 wherein step (a) further comprises:
(iii) after copying of the plurality of records in the online database to the storage device, continuing to write changes that are made to the plurality of records in the online database to the change log for only the most recent changes made to the plurality of records in the online database.

3. The method of claim 1 wherein step (b) occurs upon completion of step (a).

4. The method of claim 1 wherein step (c) occurs upon the completion of step (b).

5. The method of claim 1 wherein the storage device is a persistent storage device.

6. The method of claim 1 wherein the online database and the target database are the same database.

7. The method of claim 1 wherein step (a) further comprises:
(iii) after copying of the plurality of records in the online database to the storage device, continuing to write changes that are made to the plurality of records in the online database to the change log.

8. An apparatus for backing up an online database, the online database being actively changed by one or more applications, and subsequently restoring the backed up online database, the online database including a plurality of records, the apparatus comprising:
(a) a change log;
(b) a target database; and
(c) a processor configured to back up the online database by:
(i) copying the plurality of records in the online database to a storage device, and
(ii) during the copying of the plurality of records in the online database to the storage device, writing changes that are made to the plurality of records in the online database to the change log for a portion of the plurality of records in the online database that has already been copied to the storage device, and not writing changes that are made to the plurality of records in the online database to the change log for a portion of the plurality of records in the online database that has not yet been copied to the storage device;
the processor further configured to:
(i) apply the changes in the change log to the storage device by rolling the change log backwards, and applying only the most recent change contained in the change log for each data item in the storage device, wherein the change log includes one or more rows, records or blocks of data that have been changed, and
(ii) restore the backed up online database by loading the copied plurality of records in the online database from the storage device to a target database, wherein the target database is a distinct storage entity from the storage device.

9. The apparatus of claim 8 wherein the processor is further configured, after copying of the plurality of records in the online database to the storage device, to continue to write changes that are made to the plurality of records in the online database to the change log for only the most recent changes made to the plurality of records in the online database.

10. The apparatus of claim 8 wherein the processor is configured to apply the changes in the change log to the storage device after backing up the plurality of records in the online database.

11. The apparatus of claim 8 wherein the processor is configured to restore the backed up online database upon completion of applying the changes in the change log to the storage device by rolling the change log backwards.

12. The apparatus of claim 8 wherein the storage device is a persistent storage device.

13. The apparatus of claim 8 wherein the online database and the target database are the same database.

14. The apparatus of claim 8 wherein the processor is further configured, after copying of the plurality of records in the online database to the storage device, to continue to write changes that are made to the plurality of records in the online database to the change log.

\* \* \* \* \*